United States Patent [19]

Getson, Jr. et al.

[11] Patent Number: 4,888,727
[45] Date of Patent: Dec. 19, 1989

[54] PERIPHERAL CONTROLLER WITH PAGED DATA BUFFER MANAGEMENT

[75] Inventors: Edward F. Getson, Jr.; John W. Bradley, both of Peabody, Mass.; Joseph P. Gardner, Merrimack, N.H.; Alfred F. Votolato, Johnston, R.I.

[73] Assignee: Bull HN Information Systems Inc., Billerica, Mass.

[21] Appl. No.: 295,335

[22] Filed: Jan. 10, 1989

[51] Int. Cl.[4] .............................................. G06F 13/10
[52] U.S. Cl. ................................... 364/900; 364/926.0; 364/927.7; 364/957.1
[58] Field of Search ... 364/200 MS File, 900 MS File

[56] References Cited

U.S. PATENT DOCUMENTS

| | | | |
|---|---|---|---|
| 4,060,849 | 11/1977 | Bienvenu et al. | 364/200 |
| 4,155,119 | 5/1979 | De Ward et al. | 364/200 |
| 4,218,743 | 8/1980 | Hoffman et al. | 364/200 |
| 4,446,517 | 5/1984 | Katsura et al. | 364/200 |
| 4,542,457 | 9/1985 | Mortensen et al. | 364/200 |
| 4,602,331 | 7/1986 | Sheth | 364/200 |
| 4,616,337 | 10/1986 | Sheth | 364/900 |
| 4,644,463 | 2/1987 | Hotchkin et al. | 364/200 |
| 4,750,107 | 6/1988 | Buggert | 364/200 |

OTHER PUBLICATIONS

"Standard Printer or I/O Adapter Control Method and Apparatus", D. O. Hays et al., IBM Technical Disclosure Bulletin, vol. 22, No. 1, Jun. 1979, pp. 269–271.
"The Handbook of Computers and Computing", Ivan Flores, 1984, pp. 224–227.

Primary Examiner—Jerry Smith
Assistant Examiner—James J. Kulbaski
Attorney, Agent, or Firm—James M. Smith; Faith F. Driscoll; John S. Solakian

[57] ABSTRACT

A controller controls data transfers between a data processing system bus and peripheral devices. In the controller, data buffers are divided into page frames. Paging circuitry provides for allocation and deallocation of pages to and from the data buffer. Included in the page circuitry is a paging RAM. The paging RAM and other paging circuitry components allow contiguously addressed pages of data to be stored in noncontiguous locations in the data buffer. There may be more than one data buffer and these data buffers may be exclusively seized by microprocessors in the controller via seizing logic.

17 Claims, 5 Drawing Sheets

PERIPHERAL CONTROLLER WITH PAGED DATA BUFFER MANAGEMENT

RELATED PENDING APPLICATIONS

The following patent applications, which are assigned to the same assignee as the instant application, have been filed on the same date as the instant application, and they contain related subject matter.

| Title | Inventors | Serial No. |
| --- | --- | --- |
| Controller Having An EEPROM Firmware Store | Edward F. Getson, Jr. John W. Bradley Joseph P. Gardner & Alfred F. Votolato | 07/295,318 |
| Multiprocessor Controller Having Shared Control Store | Edward F. Getson, Jr. John W. Bradley Joseph P. Gardner & Alfred F. Votolato | 07/295,629 |
| Method And Apparatus For Limiting The Utilization Of An Asynchronous Bus With Distributed Controlled Access | George J. Barlow John W. Bradley & Edward F. Getson, Jr. | 07/295,639 |

BACKGROUND OF THE INVENTION

1. Field of Use

This invention relates generally to data processing systems. More specifically, it relates to controllers for regulating data transfers between data processing systems and peripheral devices.

2. Prior Art

Currently, most data processing systems rely on a controller to control data transfers to and from the peripheral devices. It is common for these controllers to have data buffers that temporarily store data being transferred. Such buffers act as temporary warehouses where data may be stored to provide for more efficient controller operation. These buffers handle transfers to and from a variety of different devices.

One prior controller utilized two microprocessors. One microprocessor handled transfers between a small buffer and up to four peripheral devices. The other handled transfers between the buffer and the system bus.

SUMMARY OF THE INVENTION

In one aspect of the present invention, a controller controls data transfers between a data processing system bus and peripheral devices. The controller has at least one data buffer for temporarily storing data as it is transferred between the data processing system bus and the peripheral devices. This data buffer is divided into page frames, preferably of equal size. The controller also includes two microprocessors. One microprocessor controls data transfers between the data processing system bus and the data buffer, whereas the other microprocessor controls data transfers between the at least one data buffer and the peripheral devices. In addition, the controller has paging circuitry which is coupled to the first and second microprocessors. The paging circuitry include page locating circuitry which identifies the page frames of the data buffer which are specifically assigned to blocks of data by the microprocessors. Moreover, they are coupled to the data buffer to address the identified page frames.

In the preferred embodiment, two data buffers comprise independently addressable random access memories. Seizing logic is provided for each microprocessor to exclusively seize a data buffer for as long as it takes to complete a data transfer to or from the buffer.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

In the preferred embodiment of the present invention, a controller 1 controls data transfers between a data processing system bus 2 (FIG. 1) and peripheral devices 5. Data flows to and from both the system bus 2 and the peripheral devices 5. The controller 1 has two data buffer random access memories 18X and 18Y. Data transfers between the system bus 2 and the data buffers 18X and 18Y are controlled by microprocessor 12 denoted as microprocessor B. Data transfers between the data buffers 18X and 18Y and the peripheral devices 5 are controlled by microprocessor 10 denoted as microprocessor A. The microprocessors 10 and 12 access the data buffers 18X and 18Y through the seizing logic 20 and page locating circuitry 24X and 24Y. The seizing logic controls whether the microprocessors 10 and 12 can exclusively seize a data buffer 18X or 18Y. The page locating circuitry 24X and 24Y provide the mechanisms for accessing a particular location in a data buffer 18X or 18Y.

Figure 1:
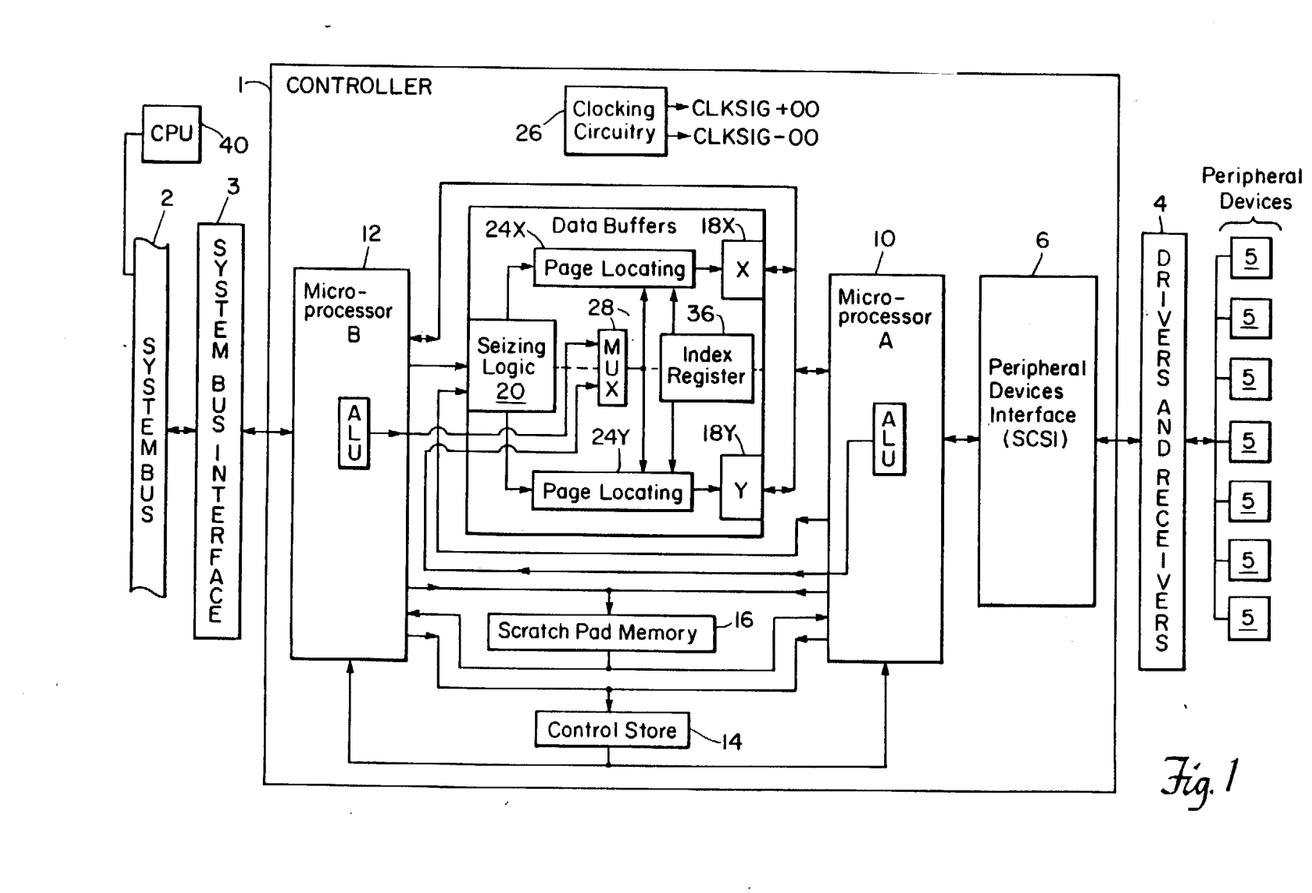
FIG. 1 shows the major elements of the controller within a data processing system.

In addition to the data buffers 18X and 18Y, the controller 1 includes a scratch pad memory 16 and a control store 14. These two components are connected to and utilized by both of the microprocessors 10 and 12. The scratch pad memory 16 is used for interprocessor communication, whereas the control store 14 is used to store microinstructions that control microprocessor operation. Microprocessor operation is also influenced by the clocking circuitry 26.

A system bus interface 3 provides the interface between the controller 1 and the data processing system. The interface to the peripheral devices 5 is provided by a peripheral devices interface 6. This interface meets the Small Computer System Interface (SCSI) specifications. In the preferred embodiment it is a Western Digital 3392 SCSI Controller Chip. It is connected to a set of drivers and receivers 4 that transmit and receive data to and from the peripheral devices 5.

The data buffers 18X and 18Y are used to temporarily store data as the data flows through the controller. The data buffers 18X and 18Y make use of a paging scheme. That is to say that data is stored in the data buffers 18X and 18Y as pages, and the data buffers 18X and 18Y are divided into page frames. Further, memory locations in the data buffers 18X and 18Y are allocated a page at a time.

Two data buffers 18X and 18Y are used in the preferred embodiment although the use of more or fewer is encompassed within the present invention. Each data buffer 18X and 18Y is comprised of sixteen page frames, and each page frame is of equal size. The data buffers can hold 64 kilobytes (64K) of memory. Thus, each page frame can hold 4 kilobytes (4K) of memory. Other sized page frames and data buffers may be used. The page frames are numbered consecutively from zero to fifteen, and each is independently addressable and accessible.

Figure 2:
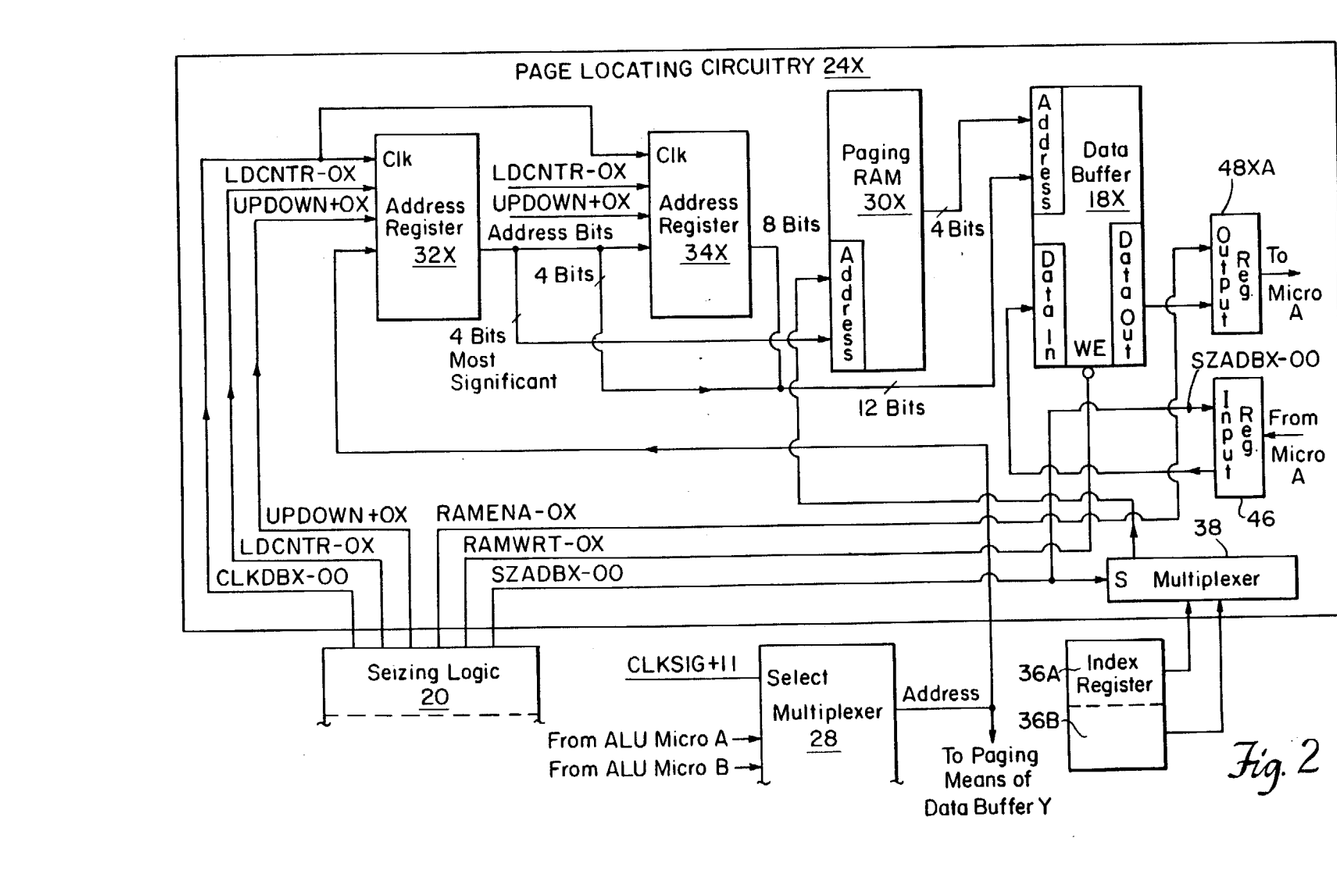
FIG. 2 shows data buffer X and its page locating circuitry in more detail.

As previously mentioned, each data buffer 18X and 18Y has its own page locating circuitry 24X and 24Y for addressing the buffer. FIG. 2 shows the page locating circuitry 24X of the data-buffer 18Y in more detail. This page locating circuitry 24X has two address registers 32X and 34X for holding incoming addresses. Address register 32X feeds into a paging RAM 30X which locates the page associated with a block of data. The paging RAM 30X as well as the address registers 32X and 34X are connected to address the data buffer 18X. Additionally, the paging locating circuitry 24X includes a multiplexer 38 which selects which input to receive from the index register 36. Details of operation of the paging locating circuitry 24 will be described below.

Figure 4:
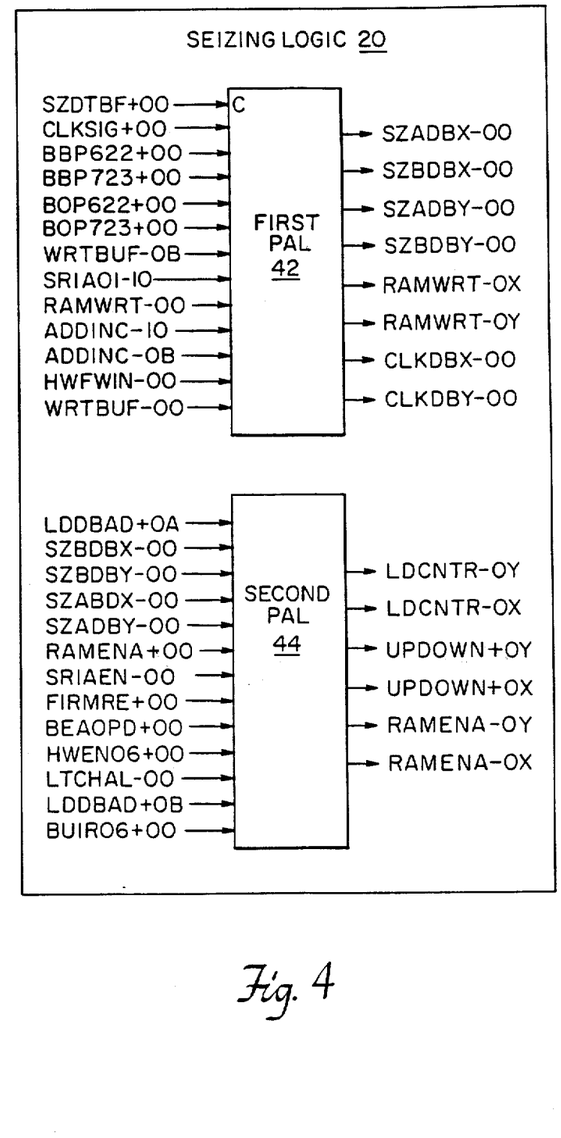
FIG. 4 shows a more detailed view of the seizing logic.

It was also previously mentioned that the data buffers 18X and 18Y have seizing logic 20 connected to them. Before the microprocessors 10 and 12 can access the data buffers 18X and 18Y, they must seize the data buffer to be accessed. FIG. 4 shows the seizing logic 20 in more detail. Discussion of the particulars of the seizing logic 20 will be discussed below.

From a broad perspective, data transfers to the data buffers 18X and 18Y operate as follows. After seizing the buffer, one of the microprocessors 10 or 12 seeks to access the seized data buffer 18X and 18Y for a data transfer (Step 50 in FIG. 5). The microprocessor 10 or 12 determines whether a read or write request has been made (Step 52). If a write request has been made, the microprocessor 10 or 12 divides the data to be written into blocks. The size of each block must be less than or equal to the size of the page frames. The microprocessor 10 or 12 then looks at the page table for the data buffer 18X and 18Y to locate free pages in the data buffer in which to store the blocks of data (Step 58). The page tables are stored in scratch pad memory 16. There is a table for each data buffer 18X and 18Y.

Figure 5:
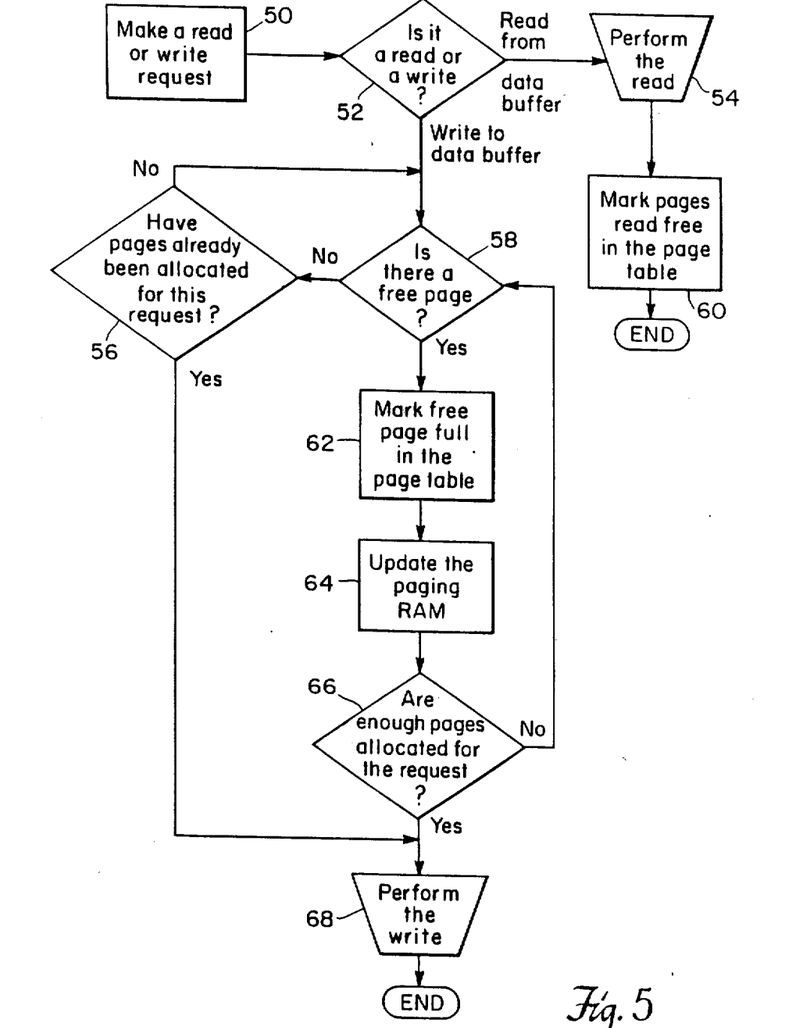
FIG. 5 is a flowchart of a method of managing data transfers to or from a data buffer.

If there are no free pages, the microprocessor 10 or 12 checks to see if any pages have already been allocated for this data transfer (Step 56). If pages have already been allocated, it proceeds to transfer the blocks of data, for which pages have been allocated, into the page frames of the data buffer 18X or 18Y. If pages have not been allocated, the microprocessor returns to checking if a free page is available (Step 58). Once a free page is found, the page is marked full (Step 62), and the paging RAM 30X is updated (Step 64). Subsequently, the microprocessor 10 or 12 checks to see if enough pages have been allocated to satisfy the memory requirements of the blocks of data (Step 66). If not enough pages have been allocated, the above process is repeated. If enough pages have been allocated, the blocks of data are transferred into the page frames of the seized data buffer 18X or 18Y (Step 68).

The data blocks are later retrieved from the data buffer 18X and 18Y by the other microprocessor 10 or 12. In other words, if microprocessor A wrote the data into the data buffer, microprocessor B would later retrieve it and vice versa. To retrieve the blocks of data, the other microprocessor 10 or 12 relies on the page locating circuitry 24X and 24Y to locate the blocks of data amongst the page frames of the data buffer 18X and 18Y. Once located, it proceeds to transfer the blocks of data out of the data buffer 18X and 18Y to their destination (Step 54) and marks as free the page frames where that data had been stored (Step 60).

The seizing logic 20 is comprised of two Programmable Array Logic (PAL) chips 42 and 44 (FIG. 4). In the preferred embodiment, PAL 20L8A and PAL 20R4 chips are used. The first PAL 42 controls whether a data buffer 18X or 18Y is seized by a microprocessor 10 or 12. The seizing is controlled by its four low active output signals: SZADBX−00, SZBDBX−00, SZADBY−00, and SZBDBY−00. In particular, if SZADBX−00 is set low by the first PAL 42, microprocessor A seizes data buffer 18X, and if SZBDBX−00 is set low by the first PAL 42, microprocessor B seizes data buffer 18X. Similarly, if SZADBY−00 is set low by the first PAL 42, microprocessor A seizes data buffer 18Y and if SZBDBY−00 is set low by the first PAL 42, microprocessor B seizes the data buffer 18Y.

The first PAL 42 contains combinatorial logic circuitry that produces the seizing outputs based on the PAL inputs. An explanation of the signals that are inputs into the first PAL and the logic equations for the seizing outputs are contained in Appendix 1. As can be seen from the logic equations in Appendix 1, whether a microprocessor 10 or 12 seizes a data buffer 18X and 18Y depends in part on the clock signals CLKSIG+00 and CLKSIG−00 produced by the clocking circuitry 26. Conflict in seizing the buffers are avoided. A more detailed description of the role of these clock signals is contained in the related application Multiprocessor Controller Having Shared Control Store.

The seizing outputs also depend on whether the data buffer 18X or 18Y to be seized is already seized by the other microprocessor 10 or 12. Further, a microprocessor 10 or 12 cannot seize a data buffer 18X or 18Y if it has already seized the other data buffer 18X or 18Y. Lastly, a microprocessor 10 or 12 can only seize a data buffer 18X or 18Y if the instruction in the microprocessor's instruction register requires access to the data buffer 18X or 18Y. The inputs into the logic circuitry for these four outputs are only valid when clocked into the PAL 42. The clocking is controlled by the firmware generated signal SZDTBF+00. This signal only clocks in these inputs when a microinstruction to seize has been made.

The first PAL 42 also controls the clocking of the address registers of the paging means 24X and 24Y. It controls them through its signals CLKDBX−00 and CLKDBY−00. CLKDBX−00 is the clock input into the address registers of page locating circuitry 24X, and CLKDBY−00 is the clock input into the address registers of page locating circuitry 24Y. The two other outputs, RAMWRT−0X and RAMWRT−0Y, act as the write pulses to the data buffers 18X and 18Y respectively. The logic equations for all four of these outputs are contained in Appendix 1.

Four of the outputs from the second PAL chip 44 are used by the address registers of the page locating circuitry 24X and 24Y. For purposes of illustration, it will help to focus on page locating circuitry 24X (See FIG.

2). The two address registers 32X and 34X have the second PAL outputs, LDCNTR−0X and UPDOWN+0X, as inputs. These two signals are used to determine what address is in the address registers. Since address registers 32X and 34X are counters, they can generate a new address by incrementing the old address, decrementing the old address, setting the new address at zero, or simply loading in a new address. In the preferred embodiment, the option of setting the address at zero is not utilized. The LDCNTR−0X and UPDOWN+0X signals determine which of these approaches is used to generate a new address.

If LDCNTR−0X and UPDOWN+0X are both low, the address would be set at zero but that option is not utilized. If LDCNTR−0X is high but UPDOWN+0X is low, the old address is decremented. Further, if LDCNTR−0X is low and UPDOWN+0X is high, a new address is loaded in, and if both signals are high, the old address is incremented. The address registers for the paging means 24Y use the corresponding signals LDCNTR−0Y and UPDOWN+0Y in an analogous manner. The logic equations for all four of these outputs as well as explanations of the inputs to the second PAL are contained in Appendix 1.

The second PAL 44 has two other outputs: RAMENA−0Y and RAMENA−0X. They control whether the data buffers 18X and 18Y are enabled. The logic equations for these output are contained in Appendix 1.

Once a data buffer 18X or 18Y is seized, the seizing microprocessor 10 or 12 has exclusive access to the seized data buffer 18X or 18Y. If both of the microprocessors 10 and 12 were allowed to store data in each data buffer 18X and 18Y, a potential deadlock situation could arise. If that deadlock would occur, both data buffers 18X and 18Y were full and the microprocessor A sought to write data into the data buffers 18X and 18Y. Microprocessor A would remain committed to a transfer from a peripheral device but would be unable to complete the transfer. The present invention overcomes this problem by exclusively dedicating at least one data buffer 18X for only storing data which has been read from the peripherals. In that configuration, such a deadlock cannot occur. Microprocessor B coupled to a system CPU 40 via the system bus 2 has greater flexibility in selecting transfers and may, at any time, unload a data buffer 18X and 18Y which has become full with transfers toward the system bus. Hence, if both data buffers 18X and 18Y are full, microprocessor B unloads data buffer 18X.

When a data buffer location is to be accessed so that new data may be written into it or the present data read out of it, the page locating circuitry 24X and 24Y are used. For example, if a location in data buffer 18X is sought by microprocessor A, the first step would be for microprocessor A to seize the data buffer 18X. The microprocessor would execute a microinstruction to seize the buffer. When this microinstruction is executed and the signals to the first PAL 42 are those needed, SZADBX−00 would be set low.

Having seized data buffer 18X, the microprocessor A accesses the memory location. Microprocessor A would send the appropriate signals to the second PAL 44 to generate the LDCNTR−0X and UPDOWN+0X signal. These signals as mentioned above determine how the new address is to be generated. If a new address is to be loaded into the address registers 32X and 34X, the eight least significant bits are first clocked into address register 32X using the CLKDBX−00 signal generated by the first PAL 42. Then, the eight most significant bits are clocked into address register 32X with the previous eight least significant bits being simultaneously shifted into address register 34X using the CLKDBX−00 clock signal.

The four most significant bits of the address held in address register 32X are passed on to the paging RAM 30X along with four bits from an index register 36A or 36B associated with the microprocessor A or B, respectively, and selected by multiplexer 38. The four bits from the index register denote one of fourteen devices from which the data originated or to which it is destined. Since up to fourteen peripheral devices 5 can be simultaneously managed by the controller 1, four bits is sufficient to identify all the peripheral devices 5. The index register 36A or 36B is selected by SZADBX−00.

The paging RAM 30X stores page frame addresses in a device dependent manner. Specifically, the four bits passed from the index register 36 identifying a particular peripheral device 5 constitute the four most significant bits of a paging RAM address. The four bits from address register 32X constitute the remaining four bits of the paging RAM address. Stored at the location addressed by these bits is a page frame address of the page of data sought to be stored in or retrieved from data buffer 18X.

The page frame address is passed on to the data buffer 18X along with the twelve remaining bits of the address held in address registers 32X and 34X. The page frame address bits are the first four most significant bits of the address of the location sought. The twelve bits from the address registers 32X and 34X are the remaining twelve least significant bits.

If a read is desired by microprocessor A from buffer 18X, the data held in buffer 18X at the address represented by sixteen bits is passed on to an output register 48XA. When the output, of register 48XA is valid, it is controlled by RAMENA−0X. There is another output register for microprocessor B. In addition, there are two similar output registers for data buffer 18Y.

If a write is to be performed by microprocessor A into buffer X, the data, is loaded into input register 46. SZADBX−0O determines when the output for this register is valid. As with the output registers, there is a corresponding input register in data buffer 18Y. Further, there are two like input registers that are used by microprocessor B to write data. The data is written into the data buffer 18X in accordance with the RAMWRT−0X write pulse signal generated by the first PAL 42. Data written into data buffer 18Y is clocked in by the RAMWRT−0Y write pulse signal also generated by the first PAL.

Figure 3:
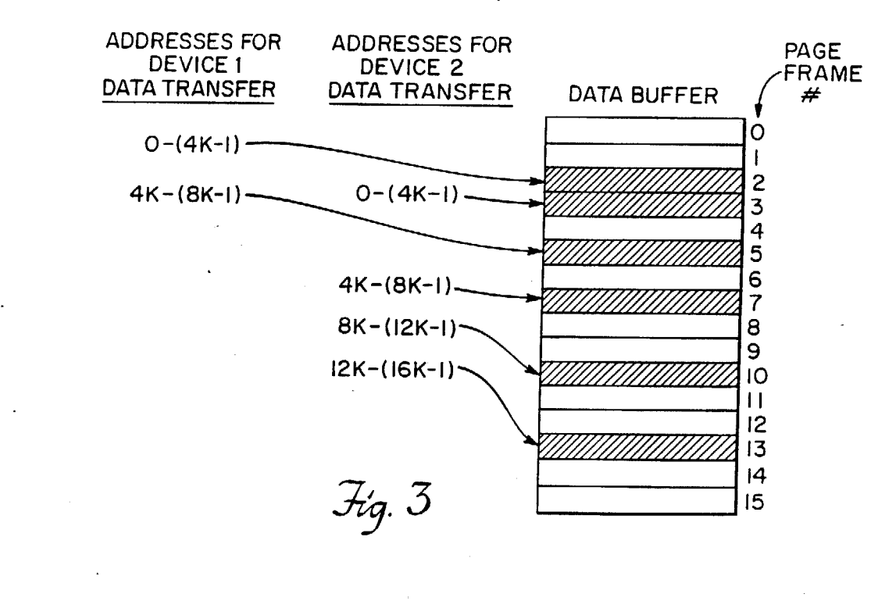
FIG. 3 shows a possible allocation of pages in the data buffer.

The present invention allows addresses to be organized contiguously while being physically located in nonadjacent page frames. Thus, as shown in FIG. 3, when a data transfer involving a first peripheral device is made which requires access to the two indicated pages of a data buffer 18X or 18Y, the addresses for these pages are viewed as contiguous by the peripheral device 5. However, the pages are physically located in two different non-contiguous locations. Similarly, when a data transfer involving a second peripheral device is made which requires access to the four indicated pages, the addresses seen by the peripheral device for the pages are contiguous from 0 to (16K−1), but they are stored in four non-contiguous locations.

This scheme allows contiguity in addressing while affording the luxury of noncontiguity in physical location. Hence, more than one hole may be combined to fulfill the memory needs while still having contiguous addresses. This combining of holes results in more efficient use of the data buffer. Moreover, there is no longer the need to wait until a large enough hole becomes available. Further, determining the address at the starting point does not present a problem because the paging RAMs take care of such matters by converting the addresses associated with devices into page addresses within a data buffer. These factors are especially important in light of the vast number of peripheral devices having different memory requirements.

While the invention has been particularly shown and described with reference to a preferred embodiment thereof, it will be understood by those skilled in the art that various changes in form and details may be made therein without departing from the spirit and scope of the invention as defined by the appended claims.

APPENDIX 1

I. First PAL

A. Input Signals

1. CLKSIG+00—primary clock signal generated by the clocking circuitry and used to synchronize microprocessor operation.
2. BBP622+00 —bit in the instruction register of microprocessor B that when set high and BBP723=00 is low indicates an instruction to seize data buffer X by microprocessor B.
3. BBP723+00—a bit in the instruction register of microprocessor B that when set high and BBP622+00 is low indicates an instruction to seize data buffer Y by microprocessor B.
4. B0P622+00—a bit in the instruction register of microprocessor A that when set high and B0P723+00 is low indicates an instruction to seize data buffer X by microprocessor A.
5. B0P723 00—a bit in the instruction register of microprocessor A that when set high and B0P622+00 is low indicates an instruction to seize data buffer Y by microprocessor A.
6. WRTBUF−0B—a write pulse from the decoder of microprocessor B.
7. SRIA01−10—a logical OR of bits from the decoder of the microprocessors.
8. RAMWRT−00—a write pulse for the RAMs that make up the data buffers.
9. ADDINC−10—a firmware or hardware clock strobe from the decoder of microprocessor A.
10. ADDINC−0B—a firmware clock strobe from the decoder of microprocessor B.
11. HWFWIN−00—a hardware clock strobe.
12. WRTBUF−00—a write pulse from the decoder of microprocessor A.

B. Logic Equations
1. SZADBX−00 = not CLKSIG+00 and B0P622+00 and not SZBDBX−00 or CLKSIG+00 and SZADBX−00 and not BBP622+00 or CLKSIG+00 and SZADBX−00 and not BBP723+00.
2. SZBDBX−00 = CLKSIG 00 and BBP622+00 and not SZADBX−00 or not CLKSIG+00 and SZBDBX−00 or CLKSIG+00 and BBP622+00 and BBP723+00.
3. SZADBY−00 = not CLKSIG−00 and B0P723−00 and not SZBDBY−00 or CLKSIG+00 and SZADBY−00 and not BBP622+00 or CLKSIG+00 and SZADBY−00 and not BBP723−00.
4. SZBDBY−00 = CLKSIG+00 and BBP723+00 and not SZADBY−00 and not BBP622+00 or not CLKSIG+00 and SZBDBY−00.
5. RAMWRT−0Y = SZBDBX−00 and WRTBUF−0B or SZADBX−00 and RAMWRT−00 or SZADBX−00 and WRTBUF−00.
6. RAMWRT−0Y = SZBDBY−00 and WRTBUF−0B or SZADBY−00 and RAMWRT−00 or SZADBY−00 and WRTBUF−00.
7. CLKDBX−00 = SZADBX−00 and SRIA01−10 and not CLKSIG+00 or SZBDBX−00 and ADDINC−0B and CLKSIG+00 or SZADBX−00 and ADDINC−10 or SZADBX−00 and HWFWIN−00 or SZBDBX−00 and SRIA01−10 and CLKSIG+00.
8. CLKDBY−00 = SZADBY−00 and SRIA01−10 and not CLKSIG+00 or SZBDBY−00 and ADDINC−0B and CLKSIG+00 or SZADBY−00 and ADDINC−10 or SZADBY−00 and HWFWIN−00 or SZBDBY−00 and SRIA010−10 and CLKSIG+00.

II. Second PAL

A. Inputs
1. LDDBAD+0A—signal generated by decoder of microprocessor A that indicates that the data buffer address will be loaded from microprocessor A.
2. SZBDBX−00 = first PAL output which indicates if microprocessor B has seized data buffer X.
3. SZBDBY−00—first PAL output which indicates if microprocessor B has seized data buffer Y.
4. SZADBX−00 first PAL output which indicates if microprocessor A has seized data buffer X.
5. SZADBY−00—first PAL output which indicates if microprocessor A has seized data byffer Y.
6. RAMENA+00—a signal from the ALU to enable the data buffers.
7. SRIAEN+00—a signal that is the logical or of whether the instruction is an ALU instruction with a bit from the microinstruction.
8. FIRMRE+00—indicates if the address is to be calculated by firmware.
9. BEAOPD+00—the complement of a signal from microprocessor B's decoder that concerns firmware addressing.
10. HWEN06+00—indicates if the address is to be calculated using hardware.
11. LTCHAL−00—allows the address registers to be used like a latch.
12. LDDBAD+0B—a signal that indicates that the data buffer address will be loaded from microprocessor B.
13. BUIR06+00—a bit from the instruction register of microprocessor B that is used in determining whether the address is incremented or decremented.

B. Logic Equations
1. LDCNTR−0Y = LDDBAD−0A and SZADBY−00 or LDDBAD−0B and SZBDBY−00.
2. LDCNTR−0X = LDDBAD−0A and SZADBX−00 or LDDBAD−0B and SZBDBX−00.
3. UPDOWN−0Y=LDCNTR−0Y or HWEN06+00 and SZADBY−00 or BUIR06+00 and SZBDBY−00.

4. UPDOWN+0X = LDCNTR−0X or HWEN06+00 and SZADBX−00 or BUIR06+00 and SZBDBX−00.
5. RAMENA−0X = SZADBX−00 and RAMENA−00 and not LTCHAL−00 or SZADBX−00 and FIRMRE+00 and not SRIAEN−00.
6. RAMENA−0Y = SZADBY−00 and RAMENA+00 and not LTCHAL−00 or SZADBY−00 and FIRMRE+00 and not SRIAEN−00.

We claim:

1. A controller for controlling data transfers between a data processing system bus and peripheral devices comprising:
   a. at least one data buffer divided into page frames for temporarily storing pages of data transferred between said data processing system bus and said peripheral devices;
   b. a first microprocessor for controlling data transfers between said data processing system bus and said at least one data buffer;
   c. a second microprocessor for controlling data transfers between said at least one data buffer and said peripheral devices;
   d. a paging means coupled to said first and second microprocessors for identifying page frames of said at least one data buffer which are assigned pages of data by said microprocessors in a non-predetermined order and coupled to said at least one data buffer to address page frames identifies in the paging means.

2. A controller as recited in claim 1 wherein there are at least two data buffers comprising random access memories which may be accessed separately by either the first microprocessor or the second microprocessor.

3. A controller as recited in claim 2 wherein at least one of the data buffers may be exclusively used only for temporarily storing data to be read from the peripheral devices.

4. A controller as recited in claim 2 further comprising seizing means for a microprocessor to exclusively seize a data buffer for as long as it takes to complete a data transfer to or from the data buffer.

5. A controller as recited in claim 1 wherein the page frames of the at least one data buffer are of equal size.

6. A controller as recited in claim 1 further comprising a scratch pad memory for storing interprocessor communications between the microprocessors.

7. A controller as recited in claim 1 wherein the paging means comprises for each data buffer a paging RAM for storing a page address of a page in a data buffer corresponding to the page indicated by an incoming address sent by one of the microprocessors, wherein that page is amongst a set of pages allocated to the peripheral device from which the data originated or to which the data is destined.

8. A controller as recited in claim 7 wherein the paging means further comprises a set of page tables stored in a shared scratch pad memory for keeping track of which pages are free and which are not free.

9. A controller as recited in claim 7 wherein the paging means further comprises for each data buffer an address register for storing incoming addresses from the microprocessors.

10. A controller as recited in claim 9 wherein for each data buffer an address register multiplexer is connected to the address register to determine whether an input address enters the address register and selects which input address in a set of input addresses is allowed to enter the address register.

11. A controller as recited in claim 10 further comprising a means for a microprocessor to exclusively seize a data buffer for as long as it takes to complete a data transfer to or from the data buffer.

12. A controller as recited in claim 9 wherein an address in the address register is divided into two parts with a first part comprising leading bits of the address and a second part comprising trailing bits wherein the leading bits of the address are passed to the paging RAM and used to select a page in the data buffer, and the trailing bits are passed to the buffer segment and used to select a specific memory location within the selected page.

13. A controller as recited in claim 7 wherein the paging RAM stores page addresses at memory addresses indexed by a device from which data to be transferred originated or to which the data to be transferred is destined.

14. A controller as recited in claim 7 further comprising a index register which passes to the paging RAM an index indicative of a device from which data to be transferred originated or to which data to be transferred is destined.

15. In a controller which controls data transfers between a data processing system bus and peripheral devices, a method of managing data transfers to and from a data buffer comprising the steps of:
   a. loading an address into an address register;
   b. passing leading bits of the address in the address register to a paging RAM;
   c. passing to the paging RAM a device identifier that identifies a device from which data to be transferred originated or to which data to be transferred is destined;
   d. using the leading bits and the device identifer to locate a page frame address stored in the paging RAM;
   e. passing the page frame address to a data buffer to locate an addressed page;
   f. locating a specific memory location sought within the located page by trailing bits of the address in the address register;
   g. performing a data transfer to or from the addressed location.

16. A method of controlling data transfers between a data processing system bus and peripheral devices comprising the steps of:
   a. dividing a data buffer into page frames;
   b. dividing data to be transferred into blocks using a first microprocessor;
   c. transferring the pages of data into page frames of the data buffer using the first microprocessor;
   d. retrieving the pages of data stored in the page frames of the data buffer using a second microprocessor;
   e. transferring the retrieved pages using the second microprocessor.

17. A method of managing a paged data buffer located in a controller comprising the steps of:
   a. loading a page table into a scratch pad memory wherein each page in the page table is initially marked free;
   b. making a request to either read data from or write data to the data buffer;
   c. if a write request,
      checking for a free page in the page table;

checking to see if any pages have been marked no longer free for this write request;

if no other pages have been marked no longer free for this write request, repeating the steps beginning with checking for a free page;

if other pages have been marked no longer free for this write request, performing the write for the pages already allocated and performing no further steps;

marking a page no longer free;

updating a page RAM to store the page frame address of a page being marked no longer free in a location in the paging RAM;

checking to see that enough pages have been allocated to handle the entire write request;

if not enough pages have been allocated, repeating the above steps;

if enough pages have been allocated, performing the write request; and d. if a read request, performing the read; and marking pages which were read free in the page table.

* * * * *